Patented June 12, 1951

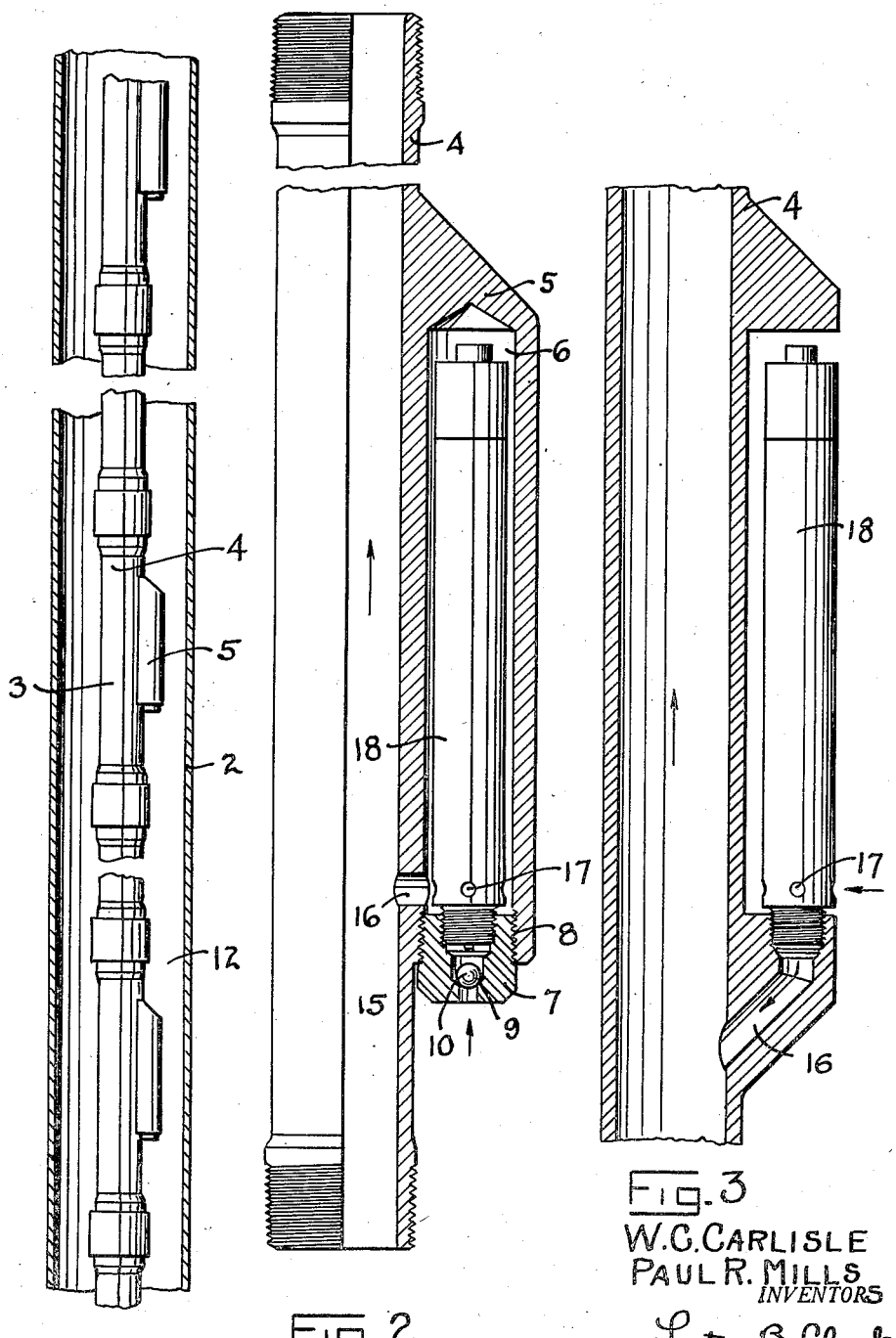

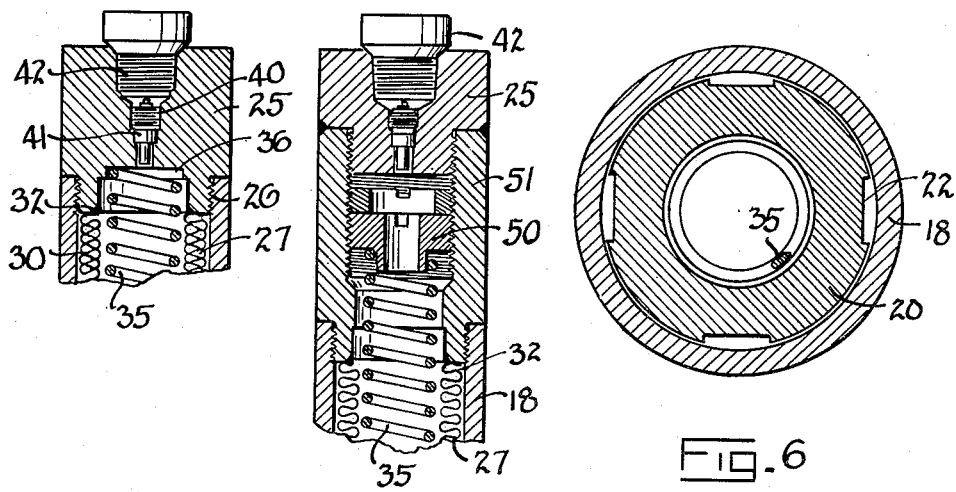
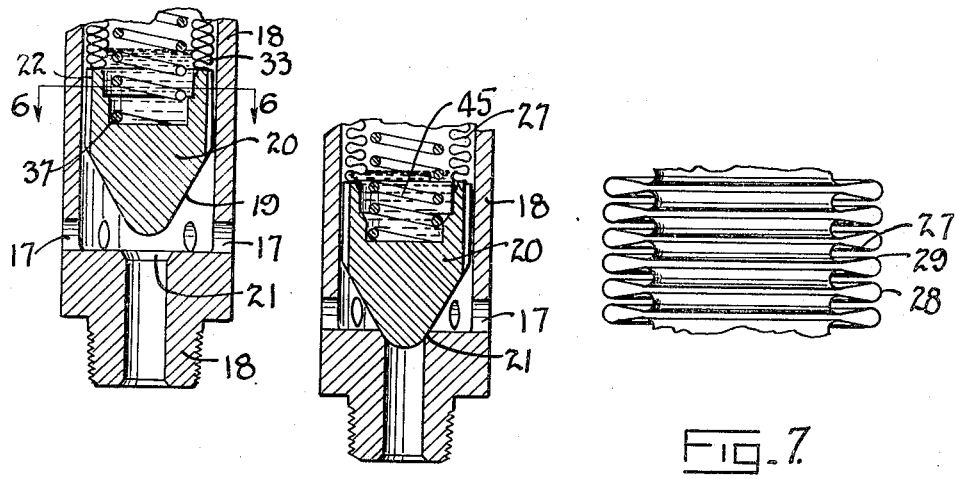

2,556,867

UNITED STATES PATENT OFFICE 2,556,867

FLOW VALVE

Willis Calvert Carlisle and Paul Roger Mills, Houston, Tex.

Application March 29, 1946, Serial No. 658,092

1 Claim. (Cl. 137—111)

This invention relates to a flow valve wherein a pressure charged bellows is provided with a supplemented spring therein to cooperate therewith in urging the valve to closed position.

In the flowing of fluid from wells it is, of course, desirable to use a minimum of pressure fluid to elevate the well liquids, and various types of control valves have been devised to govern the amount of pressure fluid admitted to the flow pipe. In order to control the movement of the flow valve, compressible bellows have been employed which have heretofore been precharged or supercharged with a fluid at a relatively higher pressure than the pressure in the well in order to maintain the valve in operating position, but to permit it to open when a pressure is applied to the outside thereof which exceeds the charge pressure.

In actual practice it has been found that such pressure charged bellows are incapable of retaining the relatively high charged pressure for any substantial period of time, and that eventually the pressure fluid leaks out to such an extent that the bellows becomes inoperative to maintain the valve closed, and it is then necessary to remove the valves from the well.

Other types of valves embodying a spring pressure to urge the valve to closed position have been devised, but the springs are usually exposed to the temperatures, corrosion, and other conditions in the well bore which results in the loss of strength of the springs, and considerable difficulty has been encountered with this type of structure.

The present invention contemplates a combination of bellows which have a relatively low pressure charge which is supplemented with a spring assembly where the spring is enclosed in the bellows so as to protect it from corrosion and other deteriorating effects. The pressure urging the valve to closed position is therefore a combination of the charged bellows and the spring pressure so that the life of the valve for satisfactory operation is substantially extended.

It is therefore one of the objects of the present invention to provide a combination charged bellows and enclosed spring construction for flow valves.

Another object of the invention is to provide a flow valve which will open in response to either pressure fluid in the well or well liquid in the tubing, but which is normally urged to closed position by a spring enclosed in a charged bellows.

Still another object of the invention is to provide an adjustment for the spring pressure on a flow valve where the spring is enclosed in a bellows construction.

Still another object of the invention is to provide a charged bellows construction for flow valves where the pressure charge is partly provided by a spring enclosed in the bellows so that the pressure charge need not be as great as where no supplemental spring is provided.

Still another object of the invention is to provide a self supporting bellows which will be limited in its longitudinal collapsing action by the folding of the bellows material.

An important object is to provide a charged bellows type of flow valve where the pressure charge in the bellows is below the surrounding pressure so that there can be no dissipation of the internal bellows charge.

Still another object of the invention is to provide a valve which is urged to closed position by a spring and bellows construction disposed within a housing which also acts as a guide for the valve.

A still further object of the invention is to provide a sealing liquid inside of a charged bellows to minimize leakage therefrom.

Other and further objects of the invention will be readily apparent when the following description is considered in connection with the accompanying drawings wherein—

Fig. 1 is a vertical section of a well bore which has been equipped with a tubing and flow valves embodying the invention;

Fig. 2 is an enlarged vertical sectional view of one of the flow valves arranged to operate by the pressure of the well liquid in the tubing;

Fig. 3 is a vertical sectional view of another form of flow valve arranged to operate by the application of pressure fluid outside of the tubing;

Fig. 4 is a broken vertical sectional view of the valve embodying the charged bellows and spring assembly, and illustrating the valve in open position;

Fig. 5 is a vertical sectional view of the valve in closed position showing the arrangement of the spring and bellows where the valve is adjustable;

Fig. 6 is a section taken on the line 6—6 of Fig. 4;

Fig. 7 is a broken detailed view of the bellows structure.

In Fig. 1 the well after having been drilled is usually equipped with a casing 2, a string of tubing or pipe 3 is then lowered into the well bore for the purpose of removing the well liquid, and this tubing is made up of the valve subs 4, each of which carries a flow valve housing 5.

Fig. 2 is an enlarged view of one of the subs 4 and illustrating the enlargement 5 thereon which is provided with an internal recess 6 closed by the plug 7 which is threaded at 8 into the lower end of the housing.

Plug 7 is provided with a seat 9 to receive the check valve 10 which prevents any return flow of pressure fluid into the annular reservoir or space 12 inside of the casing and outside of the tubing.

The sub 4 or the tubing has the central passage 15 therethrough and the port 16 leading therefrom to the interior recess 6 in the housing.

Any pressure occurring in this passage 15 due to the accumulation of a column of oil or other liquid in the tubing will, of course, be exerted through the port 16 and the openings 17 in the valve body 18.

The internal construction of the valve is best seen in Fig. 4 and it will be seen that this pressure entering the openings 17 will be exerted on the surface 19 of the valve member 20 tending to urge the valve upwardly and away from its seat 21. Fig. 4 shows the valve in open position.

The valve 20 is provided with peripheral slots 22 so as to equalize the pressure along the sides thereof and upwardly inside of the valve body.

In order to urge the valve member 20 to closed position the upper part of the body 18 is closed with a cap 25 threaded at 26 thereinto. This cap is shown as supporting a bellows 27 which is preferably made of a spring metal material having annular folds 28, as best seen in Fig. 7. These folds are particularly arranged so that the loops 29 thereof are arranged to abut each other as at 30 in the top portion of Fig. 4 when the valve 20 moves to its uppermost position. In this manner the bellows cannot collapse beyond the predetermined open position of the valve, and the abutting of the loops 29 of the bellows in this manner serves to protect the bellows against damage.

The upper end of the bellows may be secured at 32 to the lower end of the cap 25 while the lower end of the bellows 33 is secured to the top of the valve member.

When this bellows is assembled a spring 35 is inserted therein, and its upper end will be disposed in a recess 36 in the cap while the lower end 37 is disposed in a recess in the valve 20. It seems obvious that a spring may be provided having the desired compressive strength which will urge the valve 20 to closed position under the conditions and in accordance with the characteristics of the particular well in which the valve is being inserted, or in accordance with the elevation where the valve is to be placed in the well, and dependent upon the pressure at which the valve will be required to operate.

In order to urge the valve to closed position not only with the pressure of the spring 35, but with a charged pressure in the bellows as well, the cap 25 has been provided with a passage 40 having a valve 41 therein which will retain an injected or charged pressure inside of the bellows.

The closure screw 42 may also be threaded into the opening to protect the valve against damage and to avoid further leakage.

As indicated above, considerable difficulty is encountered with the leakage of the pressure charge from the bellows, and to minimize such leakage a suitable liquid 45 is shown as being present in the bellows in a small amount. Any vibration or movement of the bellows tends to coat the inner surface thereof with this liquid and fill any minute openings through which leakage might occur. A small excess of the liquid is seen in Figs. 4 and 5.

In actual operation it seems obvious that the provision of the combination spring and charged bellows substantially decreases the charging pressure at which the bellows must be maintained in order to hold the valve closed. This is possible because of the spring which adds its compressive strength to the charged pressure in the bellows. The arrangement of the spring inside of the bellows reduces corrosion substantially and minimizes crystallization of the spring material.

In event of leakage of the bellows, pressure of fluid inside and outside of the bellows tends to equalize. In this case the valve normally still remains closed as the spring pressure inside the bellows is pre-determined to a setting to resist the opposing pressure tending to unseat the valve.

While the bellows has been described as embodying a charge of pressure fluid, it is intended that the bellows may be charged to a pressure which exceeds atmospheric pressure on the one hand but which will probably be less than the pressure occurring in the well at the elevation where the valve is to be positioned. This is preferable because then, with a higher pressure on the outside of the bellows than on the inside, there will be no tendency for the pressure fluid to leak out of the bellows. If leakage should occur, the leakage would be from the outside to the inside of the bellows which would tend to additionally charge the bellows. Such a feature would be a safety feature however, because this would increase the tendency or pressure of fluid urging the valve to closed position rather than urging it to open position which lessened resistance to opening would permit loss of most of the fluid used for flowing wells.

In actual operation, it has been found that a bellows constructed as herein described has been exceptionally successful, that dispatch of the charge of pressure fluid has been obviated, and that the combination of the charged bellows and the supplemental spring provide a valve which will render long service and satisfactory operation.

In Fig. 5 the upper end of the spring 35 is shown as abutting a thrust ring 50 which is threaded in a supporting fitting 51 between the cap 25 and the body 18. This thrust ring may be suitably adjusted so as to control the compressive strength of the valve.

In Fig. 3 the arrangement of the parts is modified somewhat in that the valve body 18 is directly exposed to the pressure fluid inside the reservoir 12 outside of the tubing. This pressure fluid exerts its force through the openings 17 and when the valve opens will move through the port 16 which is shown as extending from the lower end of the valve body 18. In this form the check valve 10 will, of course, be eliminated.

Broadly the invention comprehends the combination of a charged bellows and supplemental spring assembly for flow valves.

The invention claimed is:

In a flow valve, the combination of, a housing, a flow passage through one end thereof, a valve member therein to control said flow passage, a closure for the other end of said housing, a spring adjustment means including means rotatable in said closure, a bellows connected at one end to said closure and at the other end to said valve member, a spring confined within said bellows between the valve member end thereof and said adjustment means, bellows pressure adjustment means in said closure adapted to admit fluid past said rotatable means into said bellows to charge said bellows to a pre-determined pressure above atmospheric pressure to abet said spring in urging said valve member to close said flow passage, and opening means in said housing to admit fluid thereinto to bear against said bellows.

WILLIS CALVERT CARLISLE.
PAUL ROGER MILLS.

REFERENCES CITED

The following references are of record in the file of this patent:

UNITED STATES PATENTS

| Number | Name | Date |
|---|---|---|
| 1,443,675 | Bowler | Jan. 30, 1923 |
| 1,981,965 | Morgan | Nov. 27, 1934 |
| 2,007,363 | Boynton | July 9, 1935 |
| 2,032,284 | Johnston | Feb. 25, 1936 |
| 2,040,776 | Marvin | May 12, 1936 |
| 2,082,325 | Cross | June 1, 1937 |
| 2,111,430 | Lamar | Mar. 15, 1938 |
| 2,278,420 | Boynton | Apr. 7, 1942 |
| 2,313,149 | Jacobsson | Mar. 9, 1943 |
| 2,339,487 | King | Jan. 18, 1944 |
| 2,342,301 | Peters | Feb. 22, 1944 |

FOREIGN PATENTS

| Number | Country | Date |
|---|---|---|
| 102,541 | Germany | Apr. 24, 1899 |